Figure 1:
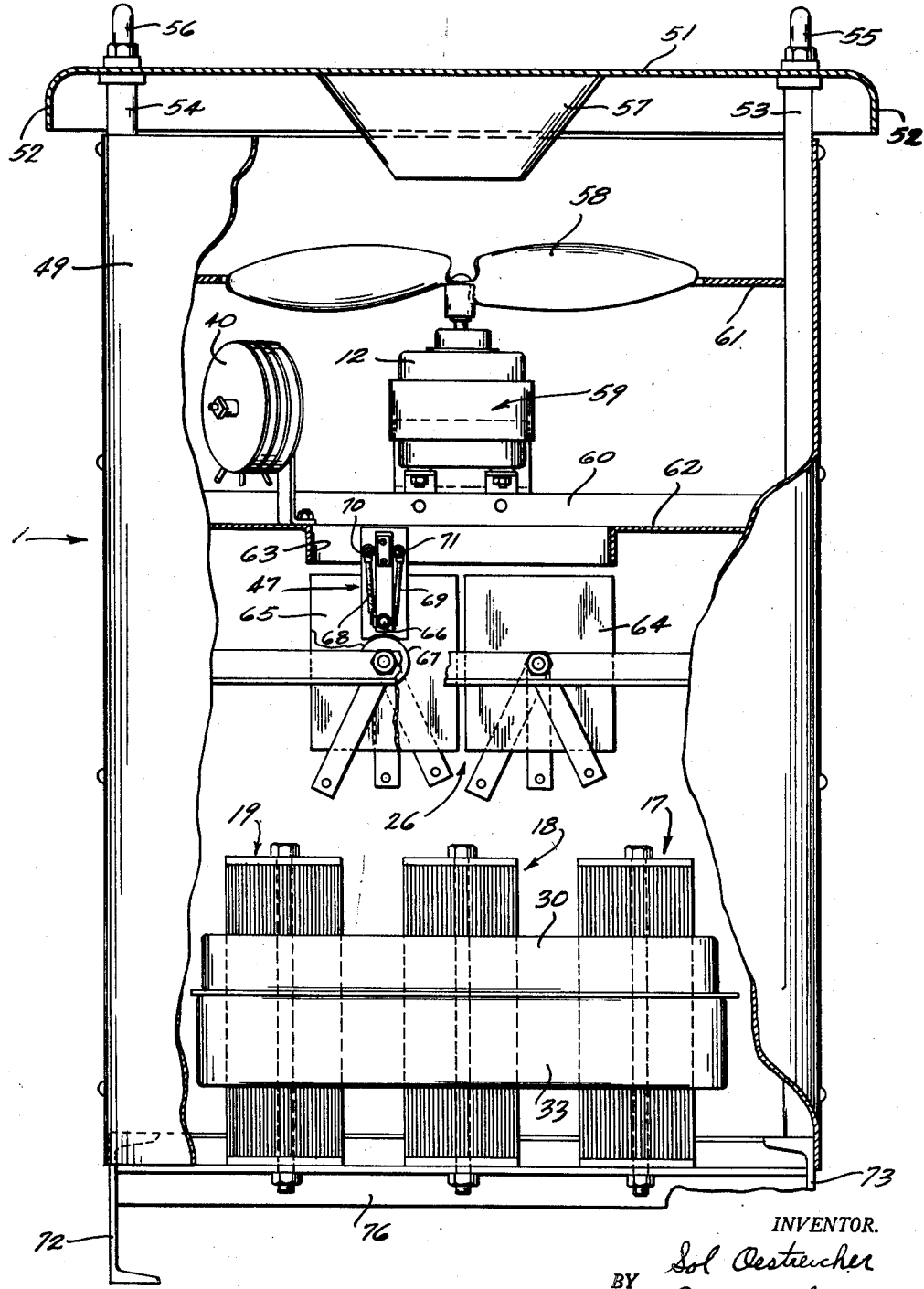

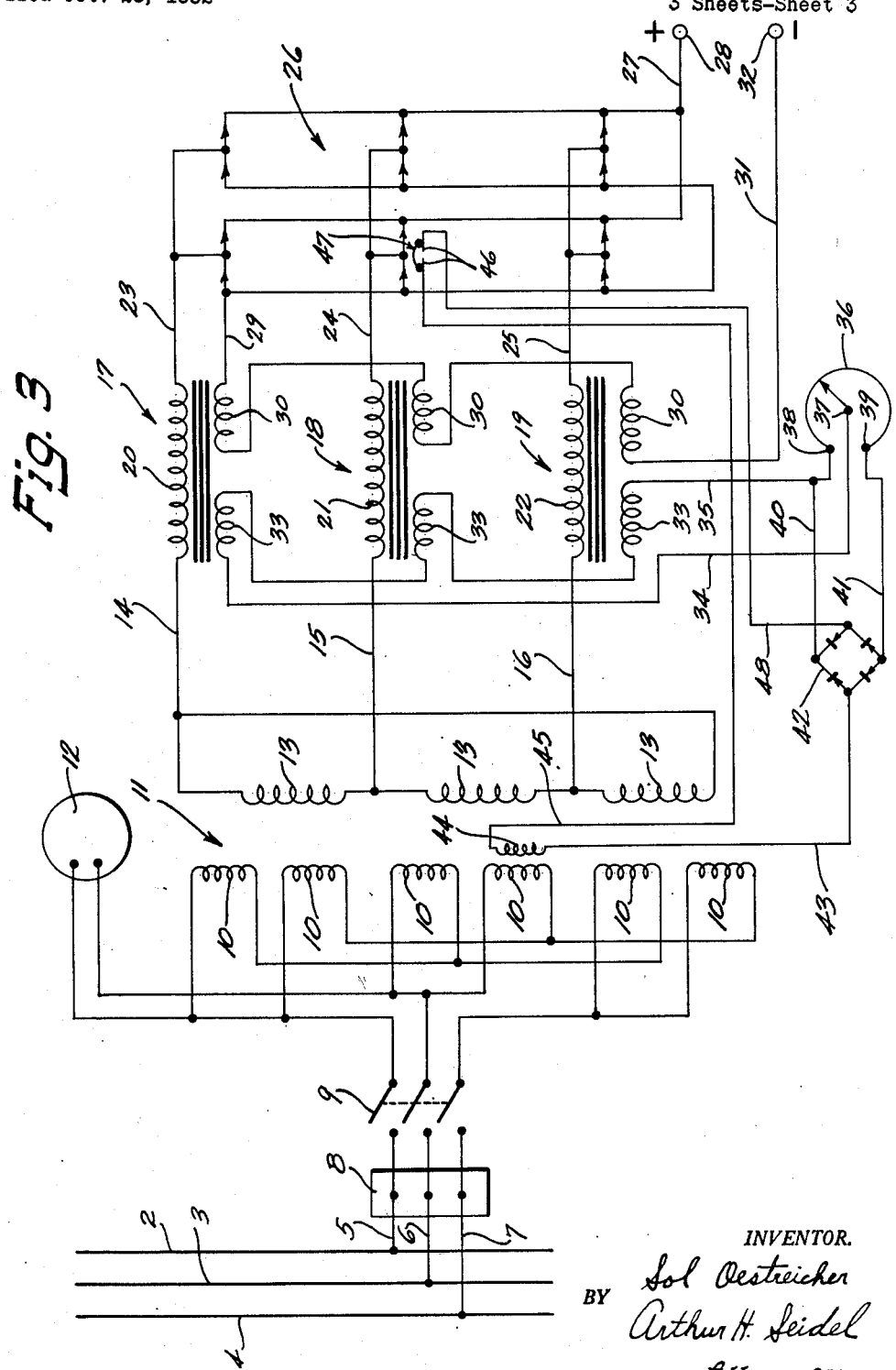

Patented May 18, 1954

2,679,024

UNITED STATES PATENT OFFICE 2,679,024

POWER SUPPLY FOR DIRECT CURRENT APPARATUS

Sol Oestreicher, Milwaukee, Wis., assignor to Harnischfeger Corporation, Milwaukee, Wis., a corporation of Wisconsin Application October 28, 1952, Serial No. 317,241

5 Claims. (Cl. 321—19)

This invention relates to alternating current operated power supplies for direct current electrical apparatus such as arc welders and the like and it more specifically resides in an apparatus having rectifying elements subject to heating for the conversion of alternating current to direct current wherein the output load current is controllable through saturable reactor means having load conducting windings and control windings related to magnetic core material to control the impedance of the load windings and wherein a temperature sensitive element of a temperature responsive switch having contacts in the reactor control winding circuit is disposed adjacent the heat emitting rectifying elements to alter the control winding circuit to cause an increase in reactor impedance upon the rectifying element reaching a predetermined temperature thus limiting the load current and protecting the apparatus from damage.

Rectifying means for supplying direct current from an alternating current power source have been provided which include not only the means of rectification but also adjustable controls for limiting and varying the value of the output current. In instances, where rectification is carried out through the employment of the dry disc type of rectifier, it is of special advantage to employ saturable reactors in the load circuit in advance of the rectifying elements as a means for controlling output because of the ease with which the output of such apparatus may be adjusted. Where such is done it is advantageous to employ two set sof control windings disposed to affect the degree of magnetization of the reactor frame and hence to control the impedance of the load windings. In accordance with this invention one of these windings is supplied with direct current provided by a control circuit having manual means for the adjustment of the excitation current. By variation of the current in the control winding the impedance of the load winding is altered and hence control of the output current is provided. The second control winding is wound to reinforce the first and is joined in the direct current load circuit, so that an increase in load current will cause an increase of control flux, which in turn further decreases the impedance of the load winding and tends to offset the internal drop in the apparatus.

In such apparatus accidental overloading gives rise to aggravated overheating of certain elements particularly the dry disc rectifier. In accordance with this invention novel means are provided which prevent such overheating.

It is an object of this invention to provide a controllable electrical rectifying apparatus wherein the output is easily controlled and which is suitable for use under widely varying load conditions.

It is also an object of this invention to provide, in a direct current power supply having rectifying means, for control of the temperature of the rectifying means to prevent the possibility of injurious overheating.

It is another object of this invention to provide, in a direct circuit power supply including rectifying elements, temperature responsive means that cause a reduction of current flow through the rectifying elements upon the temperature of the rectifying elements exceeding a predetermined value.

It is still another object of this invention to provide in a direct current power supply having saturable reactor control automatically operable switch means that cause a decrease of control current to occur in a control winding of the saturable reactor to increase the impedance in the load circuit and thus effect a reduction in load current to reduce heating of the rectifying element.

These and other objects and advantages will appear in the description to follow. In the description reference is made to the accompanying drawings in which there is shown by way of illustration and not of limitation one specific form in which this invention may be embodied.

Figure 2:
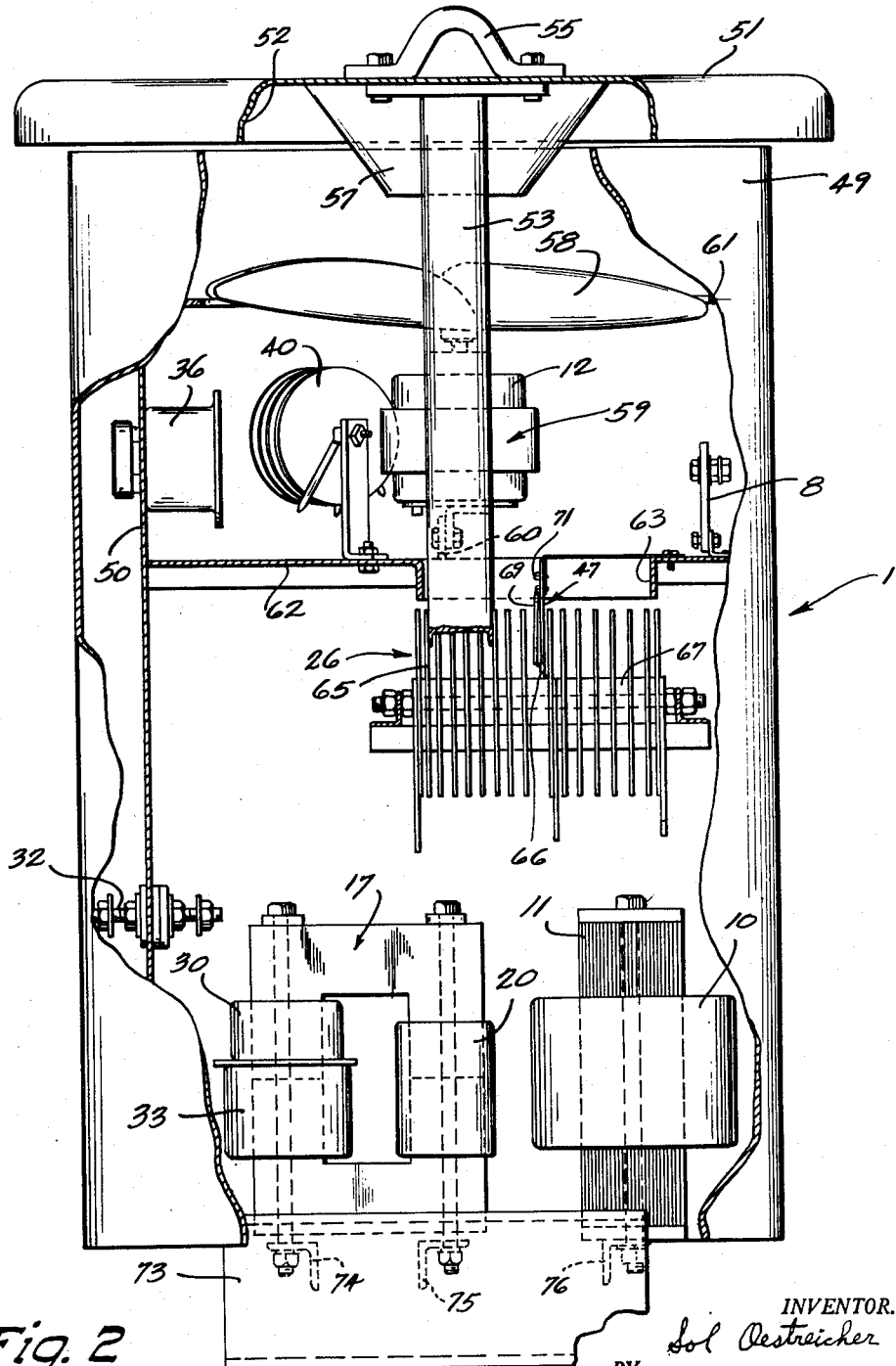

In the drawings:

Fig. 1 is a front view in elevation with parts broken away and in section of a direct current power supply in which this invention is embodied, Fig. 2 is a side view in elevation with parts broken away and in section of the direct current power supply shown in Fig. 1, and Fig. 3 is a circuit diagram of the apparatus shown in Figs. 1 and 2.

Referring now to the drawings, there is shown in Figs. 1 and 2 a power supply 1 for the conversion of alternating current to direct current that is suitable for employment as a power source for direct current welding apparatus. As shown in Fig. 3 alternating current power lines 2, 3 and 4 are joined respectively through connecting lines 5, 6 and 7 to an input terminal block 8. From the terminal block 8 connections are made to a main switch 9 and thence to the primary windings 10 of an input transformer 11. Also joined to the terminal block 8 through the main switch 9 is a cooling fan motor 12.

The transformer 11 is wound for service with either of two voltage sources. As shown in Fig. 3 the primary windings 10 are connected to provide two sets of Y connected windings which are employed for use with a lower voltage source, such as for example 220 volts. The primary windings 10 may also be connected with the two windings of each adjacent pair in series and the three resulting sets of windings connected in Y. The input voltage to the transformer 11 may then be doubled, for the same secondary voltage, and the apparatus may then be employed for example with a 440 volt source.

The secondary windings 13 of the input transformer 10 are connected to one another in delta and three leads 14, 15 and 16 extend from the windings 13 to a set of saturable reactors 17, 18 and 19 that have frames of magnetic material and load current conducting windings 20, 21 and 22 respectively. One end of each of the windings 20, 21 and 22 is joined to an end of one of the leads 14, 15 and 16 and the opposite ends of the windings 20, 21 and 22 are connected through leads 23, 24 and 25 to the input of a three phase full wave dry disc rectifier 26. The output of the rectifier 26 is joined by a lead 27 to a positive output terminal 28 of the power supply 1 and by a lead 29 to a control winding 30 and hence through a lead 31 to a negative terminal 32 of the power supply 1.

The winding 30 is shown in Fig. 3 in three segments each disposed adjacent one of the reactors 17, 18 and 19 to signify that the winding 30 is coupled with all of the frames of the reactors 17, 18 and 19. By referring to Figs. 1 and 2 it will be seen that the winding 30 comprises one coil that is linked with the frames of each of the reactors 17, 18 and 19 to provide like values of flux in the reactor frames.

A second control winding 33 is similarly associated with each of the reactors 17, 18 and 19. A lead 34 extends from one end of the winding 33 to the center tap 37 of an adjustable rheostat 36 and a lead 35 joins the opposite end of the winding 33 to an end terminal 38 of the rheostat 36. The terminal 38 and the opposite rheostat end terminal 39 are joined through leads 40 and 41 to the output of a rectifier 42. One side of the input of the rectifier 42 is joined through a lead 43 to one side of a control voltage winding 44 of the input transformer 11 and extending from the opposite side of the winding 44 is a lead 45 that is joined to a set of normally closed contacts 46 of a thermostatic switch 47. From the contacts 46 a lead 48 extends to the input of the rectifier 40 to complete the rectifier input circuit.

The physical form of the apparatus is more clearly shown in Figs. 1 and 2 where it appears that an outer casing 49 of sheet material encloses the two sides, the back and a portion of the front of the power supply 1. The remainder of the front is enclosed by a recessed control panel 50. A cover 51 raised above the casing 49 for ventilation is dished to provide downwardly turned margins 52 and is supported by a pair of vertical channel members 53 and 54. A pair of lifting shackles 55 and 56 are mounted on the top of the cover 51 and are bolted directly to the channel members 53 and 54. An air deflecting baffle 57 is mounted centrally on the underside of the cover 51 and is disposed directly above a fan 59 having blades 58 driven by the fan motor 12 shown schematically in Fig. 3. The fan 59 is mounted on a cross brace 60 extending between the vertical channels 53 and 54 and the blades 58 are encircled by an orifice plate 61 to enhance the action of the fan 59 in circulating air through the apparatus. Beneath the fan 59 is a horizontal partition 62 that forms a second air directing baffle and which provides a rectangular opening 63 disposed directly above the three phase full wave rectifier 26. Circulated air is thus compelled to cross the cooling fins of a pair of disc type rectifying units 64 and 65 that comprise the rectifier 26.

The thermostatic switch 47 previously mentioned is mounted with its thermally responsive element 66 disposed between a pair of rectifier cooling fins and adjacent the central core 67 of the rectifying unit 65. The element 66 includes a bi-metal actuator cooperatively engaging the switch contacts 46, which are housed within the element 66 so as not to be visible in Figs. 1 and 2. The contacts 46 are opened and closed upon movement of the bi-metal of the element 66 in response to temperature change. A pair of leads 68 and 69, forming a part of the switch 47 extend from the element 66 to suitable terminals 70 and 71 for connection to the leads 45 and 48, which are not shown in Figs. 1 and 2.

A pair of large channel members 72 and 73 disposed at the bottom and at opposite sides of the power supply 1 form the base support for the apparatus and extending therebetween are angle braces 74, 75 and 76. Secured to the angle braces 76 is the input transformer 11 and mounted upon the angle braces 74 and 75 are the saturable reactors 17, 18 and 19 which are aligned to permit the coils 30 and 33 to link with the frame of each.

Input terminal block 8 is mounted at the rear of the horizontal partition 62 for convenient connection to power lines that lead into the apparatus from the rear. The rheostat 36 is mounted on the control panel 50 above the partition 62 and the rectifier 42 that supplies direct current to the control winding 33 is mounted on the partition 62 behind the rheostat 36, while the output terminals 28 and 32 are located on the lower portion of the panel 50 in the near vicinity of other load conducting elements of the apparatus.

In the operation of the apparatus control is exercised over the load current by adjustment of the rheostat 36. In this manner the excitation of the winding 33 is varied to alter the impedance of the load windings 20, 21 and 22 of the reactors 17, 18 and 19. A second control, which performs an automatic adjustment of output is provided by the winding 30. The winding 30 is so disposed that the flux thereof reinforces the flux due to the winding 33. The winding 30 thus acts to offset to some extent the internal voltage drop in the apparatus to provide characteristics more suitable for an operation such as welding. The ampere turns provided in the winding 30 at maximum output are limited to a value insufficient in itself to saturate the frames of the reactors 17, 18 and 19.

The regulation of load current provided by the control windings 30 and 33 is intended for normal working operations. Excessive loads caused by a short circuit or other unforseen occurrences, that may be injurious to the apparatus, are controlled by automatic means responsive to the heating effects arising in the rectifier 26.

Heat loss due to the resistance of the rectifier 26 causes the internal temperature thereof to rise. The temperature of the sensitive element 66 of the thermostatic switch 47 which is disposed close to parts of the rectifier which are subject to such heating follows the temperature of the rectifier closely and promptly. The heat communicated to the element 66 will provide for the necessary measure of rectifier temperature regardless of whether temperature rise is due to excessive currents or to other failure such as failure of the fan 59 to maintain a sufficient flow of cooling air across the plates of the rectifier 26.

Upon approach of the temperature in the thermostatic switch element 66 to dangerous level the contacts 46 open and excitation in the winding 33 is terminated. Excitation of the winding 30 alone remains. This immediately gives rise to an increase in impedance of the windings 20, 21 and 22 since winding 30 is insufficient to saturate the cores of reactors 17, 18 and 19. Load current therefor drops and excitation of winding 30 is further reduced causing a further increase in impedance in windings 20, 21 and 22. Output thus continues to decay to an equilibrium value low enough to prevent damage to the apparatus.

I claim:

1. In a power supply for direct current apparatus the combination comprising input terminals for connection to a source of alternating current; a set of output terminals; saturable reactor means including a magnetic frame, load current windings linking said frame, and control windings linking said frame; a load rectifier; a load circuit joining said load current windings of said reactor means and said rectifier in series relation between said input and output terminals; a control rectifier having input and output terminals; a control circuit joining said control rectifier input terminals to a source of alternating current and said control rectifier output terminals to said control windings; and means associated with said load rectifier responsive to the temperature of the same operative upon the flow of currents that cause excessive temperature in the load rectifier to reduce the control current in said control windings.

2. In a power supply for direct current apparatus the combination comprising input terminals for connection to a source of alternating current; a set of output terminals; saturable reactor means including a magnetic frame, load current windings linking said frame, and control windings linking said frame; a load rectifier; a load circuit joining said load current windings of said reactor means and said rectifier in series relation between said input and output terminals; a control rectifier having input and output terminals; temperature responsive switch means including a temperature sensitive element disposed adjacent said rectifier and a set of switch contacts biased to a normal position and movable therefrom in response to increase in temperature of said temperature sensitive element; and a control circuit including said switch contacts and said control rectifier joining said control rectifier input terminals to a source of alternating current and said control rectifier output terminals to said control windings when said switch contacts are in normal position; said switch contacts being operative upon movement from normal position to decrease current supplied to said control winding.

3. In a power supply for direct current apparatus the combination comprising input terminals for connection to a source of alternating current; a set of output terminals; saturable reactor means including a magnetic frame, load current windings linking said frame, first control windings linking said frame, and second control windings linking said frame, a load rectifier; a load circuit joining said load current windings of said reactor means, said rectifier, and said second control windings of said reactor means in series relation between said input and output terminals; a control rectifier having input and output terminals; a rheostat; temperature responsive switch means including a temperature sensitive element disposed adjacent said rectifier and a set of switch contacts biased to a normal position and movable therefrom in response to increase in temperature of said temperature sensitive element; and a control circuit including said switch contacts, said rheostat, and said control rectifier joining said control rectifier input terminals to a source of alternating current and said control rectifier output terminals through said rheostat to said first control windings when said switch contacts are in normal position to provide an excitation current in said first control windings that produces a flux that reinforces the flux of said second control windings; said switch contacts being operative upon movement from normal position to decrease current applied to said control winding.

4. In a power supply for direct current apparatus the combination comprising input terminals for connection to a source of alternating current; a set of output terminals; saturable reactor means including a magnetic frame, load current windings linking said frame, and control windings linking said frame; a dry disc rectifier having a plurality of spaced cooling fins; a load circuit joining said load current windings of said reactor means and said rectifier in series relation between said input and output terminals; a control rectifier having input and output terminals; a rheostat; a temperature responsive switch including a temperature sensitive element disposed between a pair of said rectifier cooling fins and a set of normally closed switch contacts movable to open position in response to increase in temperature of said temperature sensitive element; a control rectifier output circuit joining the output terminals of said control rectifier through said rheostat to said control winding; and a control rectifier input circuit joining the input terminals of said control rectifier through said normally closed contacts to a source of alternating current; said switch contacts being operative upon movement to open position to open said control rectifier input circuit.

5. In a power supply for direct current apparatus the combination comprising input terminals for connection to a source of alternating current; an input transformer having a primary winding connected to said input terminals, a secondary winding, and a control voltage winding; a set of output terminals; saturable reactor means including a magnetic frame, load current windings linking said frame, and control windings linking said frame; a load rectifier; a transformer secondary circuit joining said load current windings of said reactor means between the secondary of said transformer and the input of said rectifier and joining the output of said rectifier to said output terminals; a control rectifier having input and output terminals; temperature responsive switch means including a set of contacts biased to closed position and a temperature sensitive member operable upon heating to move said contacts to open position; and a control circuit including said switch contacts and said control rectifier joining said transformer control voltage winding to said control windings of said reactor through said control rectifier and said switch contacts when said switch contacts are in closed position; said switch contacts being operative upon movement to open position to open said control circuit.

References Cited in the file of this patent

UNITED STATES PATENTS

| Number | Name | Date |
|---|---|---|
| 1,834,416 | Osgood | Dec. 1, 1931 |
| 2,012,588 | Logan | Aug. 27, 1935 |
| 2,107,360 | Behrens | Feb. 8, 1938 |
| 2,212,229 | Giroz | Aug. 20, 1940 |